United States Patent Office 3,452,357
Patented June 24, 1969

3,452,357
METHOD AND MEANS FOR RADIO-LOCATING A RADIO-RECEIVING STATION
Etienne Augustin Henri Honore, Chatenay-Malabry, and Emile Leon Gabriel Torcheux, Paris, France, assignors to Neo-Tec, Societe d'Etude et d'Application des Techniques Nouvelles, Paris, France
Filed July 12, 1967, Ser. No. 652,963
Claims priority, application France, July 29, 1966, 71,367
Int. Cl. G01s 1/30
U.S. Cl. 343—105
7 Claims

ABSTRACT OF THE DISCLOSURE

A method and means for radio-locating a movable receiver by means of the beats between incoming pairs of waves wherein two receiving channels are selectively associated with a local oscillator producing the same frequency $f$ as the beats and the output phase of which is shifted by a predetermined amount before comparison with either received wave so as to allow if required operating with a single channel. Means are also provided for ensuring measurements with increasing accuracies.

---

Our invention has for its object modifications of or improvements in the method and means claimed in prior application Ser. No. 579,757, now U.S. Patent Number 3,392,389, for radio-locating a radio-receiving station. Said prior specification covered a method and means for radio-locating a movable receiver by radiating from a first transmitter two unmodulated waves $F_1$ and $F_3$ and from a second transmitter two unmodulated waves $F_2$ and $F_4$ to produce beat waves of equal frequencies $f = F_1 - F_2 = F_3 - F_4$ in corresponding channels of the receiver station, said method being characterized by the production at the receiver station of a local wave tuned substantially to said beat frequency and by the measurement of the phase difference between said local wave and that fed by one of said channels, said phase difference being then divided by a predetermined figure $$N \frac{F_1}{F_1 - F_3}$$

so as to produce the desired radio-locating measurement, said divided phase difference phase shifting the phase in one of the channels, the phase-shifted wave being compared with the beat frequency in the other channel to produce an adjusting voltage adapted to maintain constancy of the local frequency $f$.

According to the present invention, the required division is performed by measuring selectively the phase difference between said local phase-shifted waves and the beat waves produced by either of the receiver channels, said phase difference tapped off the corresponding phase-shifted local waves forming when divided by said predetermined figure the desired radio-locating measurement.

This method leads to inserting a switch in the wiring diagram disclosed in the prior specification so as to ensure thus connection of the discriminator subjected to the phase difference between said local frequency waves and that of the beats in either channel with the selected channel.

In the accompanying drawings:

FIGS. 3 to 5 are wiring diagrams relating to various developments of the invention.

1 and 2 designate as in the prior specification the conventional parts supplying at their output the beat voltages $F_1 - F_2 = f$ for the first channel I and $F_3 - F_4$ for the second channel II. 3 designates again a stable oscillator producing a wave frequency $f$, 6 designates the auxiliary motor driving the rotary phase-shifting means, respectively the phase-lifting means 5 rigid with the output shaft of the motor 6 and the phase-shifting means 10 driven by said output shaft of the motor 6 with the interposition speed reducer 9 ensuring a speed-reducing ratio N, the value of N being equal to $$\frac{F_1}{F_1 - F_3}$$

Figure 1:
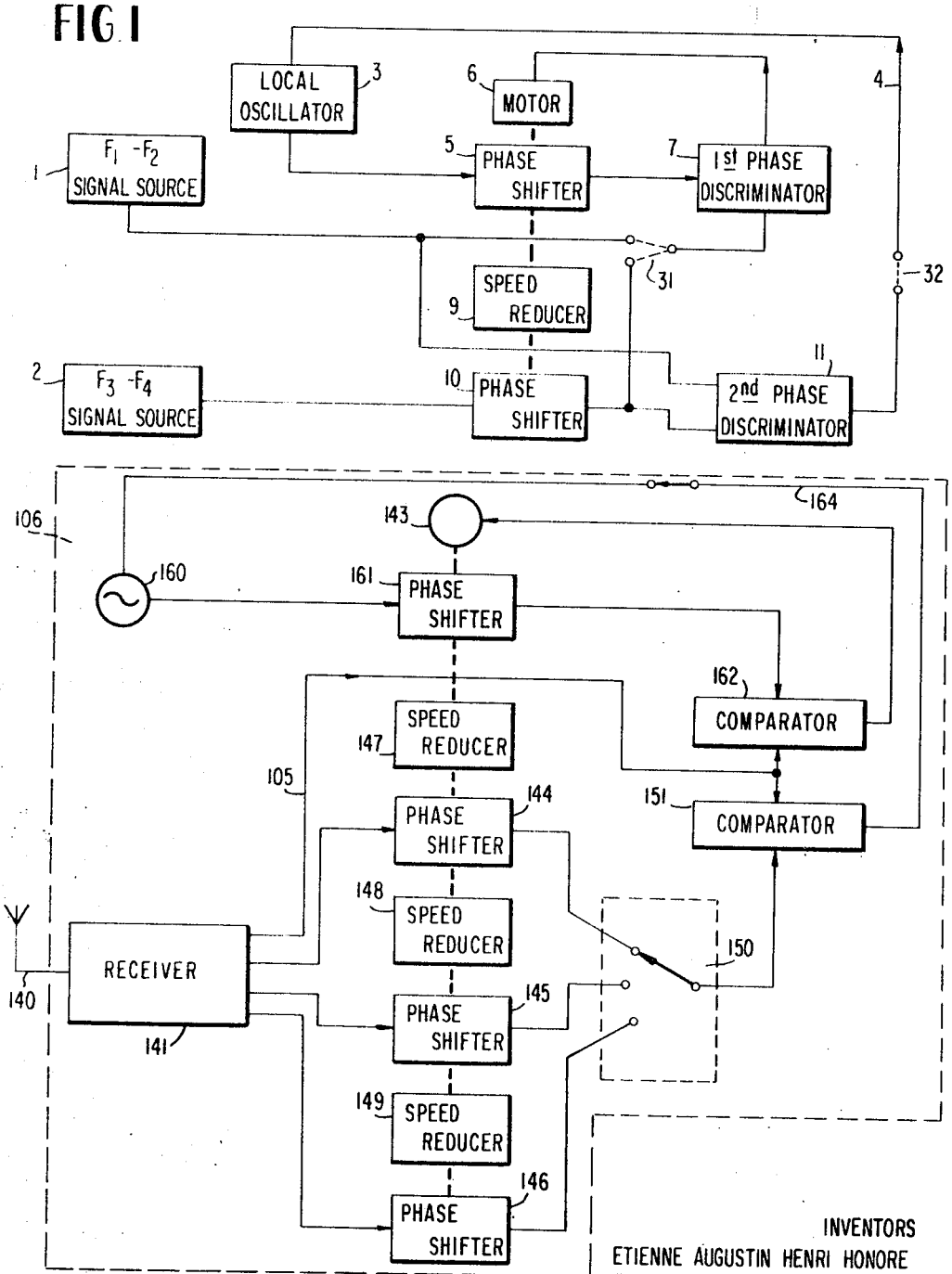
FIG. 1 illustrates a modification of the receiver illustrated in FIG. 1 of the prior specification.

In FIG. 1 of the prior specification, the phase-shifting means 5 is inserted between the output of the supply 1 and the first input of the phase comparator or discrimator 7, whereas in the case illustrated in FIG. 1 of the present specification, said phase-shifting means is inserted between the output of the oscillator 3 and the second input of the discrimator 7. This leads to no modification in the desired operation, provided of course there is a change in sign of the value of the phase shift produced by said phase-shifting means. The same result is thus obtained as in the case of said prior specification.

In contradistinction, the modification disclosed allows connecting the first input of the discriminator 7 selectively with the first supply 1 as in the case of the prior specification or else, upon operation of a switch 31 with the output of the further phase-shifting means 10 associated with the second supply 2.

This leads to the advantage of allowing at least transiently an operation in the absence of any voltage supplied by the first channel at the output of the supply 1. As a matter of fact, in such a case the discriminator 7 remains fed under accurate conditions on the one hand by the output of the supply 2 through the phase-shifting means 10 and on the other hand by the oscillator 3 through the phase-shifting means 5 and consequently the auxiliary motor 6 continues operating under normal conditions. In contradistinction, the voltage at the output of 11 is no longer significant in the case of a failure in the output voltage of the supply 1. In order to prevent in such a case an objectionable drift of the oscillator 3, it is preferable to open the connection 4 between the parts 11 and 3 for instance by means of a switch 32. Consequently, under normal operative conditions, the discriminator 7 is fed on the one hand by the oscillator 3 phase shifted 5 and on the other hand by the output of the supply 1, while the discriminator 11 is fed on the one hand by the output of the supply 1 and on the other hand by the output of the supply 2 through the phase-shifting means 10.

When the voltage in the channel 1 fails or if it is desired not to use it transiently, the switches 31 and 32 are operated and the oscillator feeds a constant frequency by reason of its natural stability, while the discriminator 7 is fed on the one hand by said oscillator through phase shifter 5 and on the other hand by the output of the supply 2 through phase shifter 10. It is obvious as a matter of fact that during normal operation the voltages fed by the supply 1 and by the phase comparator 10 are practically in unvarying phase relationship and consequently the operation of the arrangement is by no means disturbed by feeding the first input of the discriminator 7 with the ouptut of phase shifter 10 instead of with the output of supply 1. Furthermore, since the output of the discriminator 11 is adapted to control through the connection 4 the operation of the oscillator 3 in a manner such that its frequency may be constantly equal to $f$ while said oscillator is very stable by reason of its actual structure, it is possible to cut off the connection 4 during a short time without the oscillator 3 drifting to a substantial extent while the measurement supplied by 10 remains reliable during the same period.

Of course, if the voltage were to fail in the second channel II, it is sufficient to cut off the connection 4 by operating the switch 32 while continuing the feed of the discriminator 7 by the voltage passing out of the supply 1 in order to obtain the same result as hereinabove.

An application of the invention to a system allowing measuring with different sensitivenesses will now be described, said system resorting solely to two transmitters radiating each more than two waves.

Figure 2:
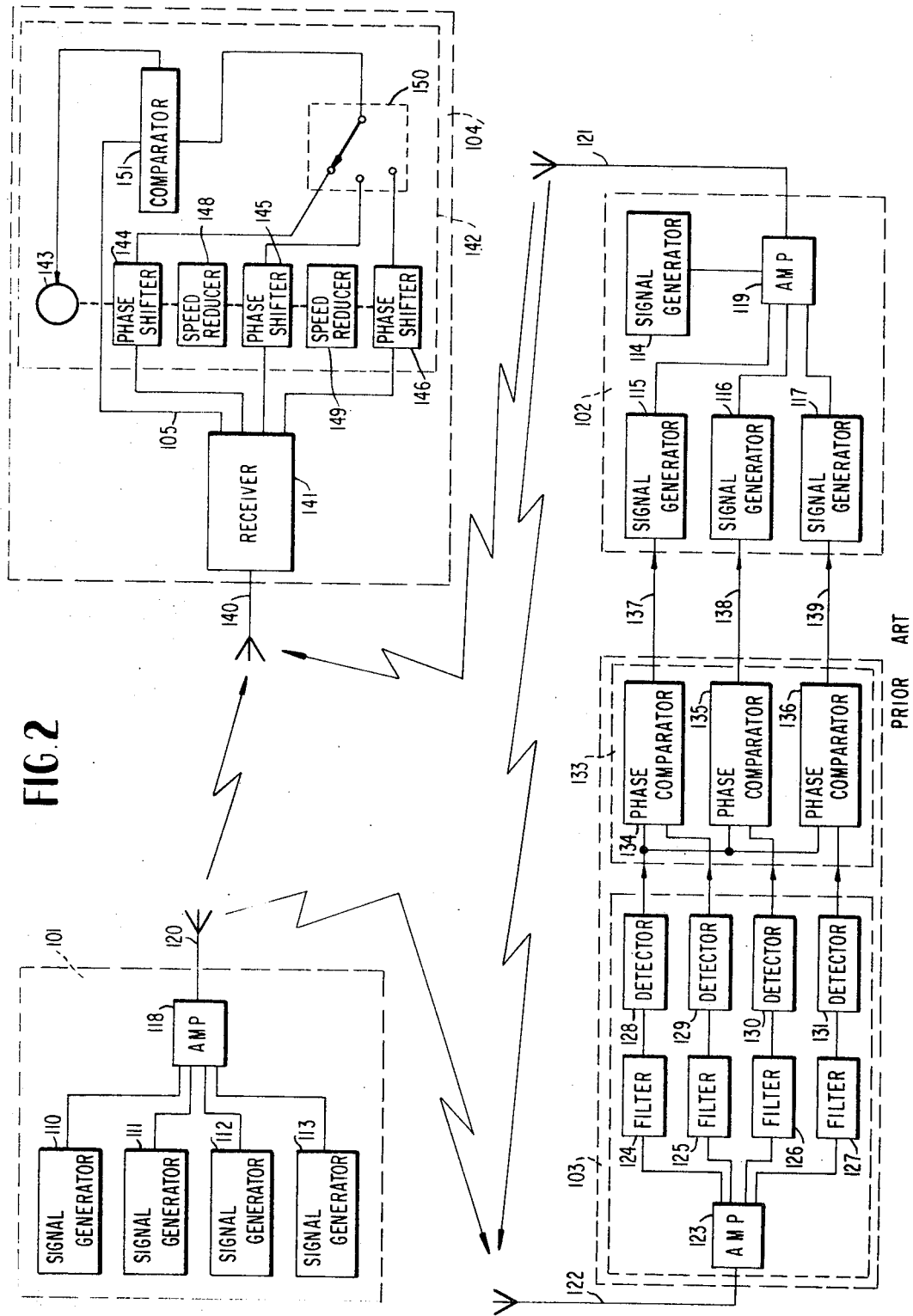
FIG. 2 illustrates a known arrangement.

FIG. 2 illustrates diagrammatically a known arrangement of such a type operating with four pairs of waves.

In said figure, 101 designates a transmitter producing four unmodulated waves at frequencies $F_5$, $F_6$, $F_7$, $F_8$. To this end, the transmitter includes four generators, to wit: the generators 110, 111, 112, 113 supplying respectively the frequencies $F_5$, $F_6$, $F_7$, $F_8$. Said generators feed a common power amplifier 118 connected with a transmitting aerial 120. A second transmitter 102 located at a different point produces similarly four further unmodulated waves $F_9$, $F_{10}$, $F_{11}$, $F_{12}$ fed respectively by the generators 114, 115, 116, 117. These four generators also feed a common amplifier 119 connected with a transmitting aerial 121.

It is a known fact that in such an arrangement the values of the eight frequencies are selected in a manner such that the frequencies of the beat waves $F_9-F_5=f_1$, $F_{10}-F_6=f_2$, $F_{11}-F_7=f_3$, $F_{12}-F_8=f_4$ are all equal to $f$, while furthermore the relative phase relationships between said beats at a predetermined point do not vary with time and are equal to well-defined constants.

The system of four waves $F_5$, $F_6$, $F_9$ and $F_{10}$ forms an arrangement operating in the manner disclosed in the prior specification so as to supply a first measurement of the phase shift which constitutes generally a fine measurement, that is a measurement of a high sensitivity which may be characterized for instance by the ratio $$V/F_9-F_5$$

wherein V designates the speed of propagation of the waves.

It is a well-known fact that the phase shift between the waves $F_1$ and $F_3$ provides a measurement of a mean sensitivity which may be in the ratio $k$ with reference to the fine sensitivity, $k$ being defined by the relationship $$F_{11}-F_9=\frac{1}{k}(F_{10}-F_9)$$

Similarly, the phase shift between the waves $f_1$ and $f_4$ provides a measurement of a rough sensitivity and there is generally obtained in this case a ratio $k^2$ such that $$F_{12}-F_9=\frac{1}{k^2}(F_{10}-F_9)$$

In order that the beat waves satisfy the above-referred to requirements, a control system 103 located away from the transmitting systems 101 and 102, for instance at a small distance from 102 receives through its aerial 122 the eight frequencies radiated by 101 and 102. It amplifies said frequencies at 123 and separates the four beat waves $f_1$, $f_2$, $f_3$, $f_4$ by means of filters 124, 125, 126, 127 followed by detecting means 128, 129, 130, 131 which latter supply at their output ends the beat waves. The voltages passing out of the detectors 128 and 129 are fed to a phase comparator 134 controlling through the connection 137 the generator 115 in a manner such that its frequency supplies a beat with the waves supplied by 111, which beat has the same frequency as the beat between 110 and 114, while the phase relationship is locked and similarly the phase comparator 135 is fed with the voltages from the detectors 128 and 130 and acts through the connection 138 on the generator 116 so as to constrain the wave fed by 116 to form with the output of 112 beats at the same frequency as the beats between 110 and 114, again with the locking of the phase. Lastly, the comparator 136 fed by the detectors 128 and 131 acts through the connection 139 on the generator 117 with a view to obtaining a similar result.

The movable receiving station 104 located at the point of which it is desired to ascertain the position includes an aerial 140 adapted to receive the waves produced by the transmitters 101 and 102. The corresponding voltages passing out of said aerial reach the receiver 141 which produces at its output voltages corresponding to the four beat waves of frequencies equal respectively to $f_1$, $f_2$, $f_3$ and $f_4$, the wave $f_1$ passing through the upper terminal designated by 105.

The waves of frequency $f_1$ feed the first input of a phase comparator 151 controlling an auxiliary motor 143 to the shaft of which the phase shifting means of a rotary type say 144, 145 and 146 are keyed. Between the phase-shifting means 144 and 145 is inserted a speed reducer 148 of which the ratio of reduction is equal to $k$, while a further speed reducer is inserted between the phase shifting means 145 and 146 the ratio of reduction of last-mentioned speed reducer 149 being also equal to $k$.

The received waves $f_2$, $f_3$, $f_4$ are phase shifted at 144, 145, 146 and are fed to the three stationary contact-pieces of a three way switch 150 of which the movable contact-piece is connected with the second output of the comparator 151. When the switch 160 connects the comparator 151 with the phase-shifting means 144, the fine sensitivity is obtained, whereas when said switch connects the comparator 151 with 145, the mean sensitivity is obtained and when 151 is connected with 146 the rough sensitivity is obtained. In a more accurate manner, the connection between 151 and 146 provides a rough positioning of the output shaft of the auxiliary motor 143 and this position is then defined more accurately by connecting 151 with 145 so as to obtain a mean sensitivity and thenafter the connection between 151 and 144 affords a fine sensitivity.

The application of the invention to the arrangement illustrated in FIG. 2 consists in modifying on the receiving side the receiver 104 with a view to obtaining the wiring diagram according to FIG. 3. Said FIG. 3 again shows the aerial 140 and receiver 141 supplying the four beat waves $f_1$ to $f_4$, the wave $f_1$ appearing at the output terminal 105 while the auxiliary motor 143 controls as precedingly the phase-shifting means 144 and also 145 and 156 with the interposition of the speed reducers 148 and 149, the switch 150 and the phase comparator 151 being also retained.

Now the invention consists in incorporating with such a receiver a stable generator 160 supplying a frequency the value of which is equal to the common value $f$ of the frequency of the beat waves $f_1$ to $f_4$. The frequency of said generator is always controlled under large time constant conditions by the output voltage of the comparator 151, as provided by the connection 164. Furthermore, a rotary phase shifter 161 is keyed to the shaft of the auxiliary motor 143 and a speed reducer 147 is inserted between the latter and the phase shifter 144. Lastly, a second phase comparator 162 is connected through one of its inputs with the terminal 105 while its other input is connected with the generator 160 through the phase shifter 161. The output voltage of said comparator 162 controls in such a case the auxiliary motor 143.

It is immediately apparent that when the switch 150 connects the second input of 151 with 144 the wiring diagram is similar to that illustrated in FIG. 1 described hereinabove.

When the switch 150 connects 151 with 145, the operation is similar, but the sensitivity of the control obtained by 160 is reduced in a ratio $k$. Lastly, when 151 is connected with 146, said sensitivity is reduced in a ratio $k^2$.

Obviously as in the case of the prior specification the phase shifting means 161, instead of being inserted at the output end of 160, may be fed by the terminal 105, provided the sign of the phase shift executed is changed, but in all cases the first input of the comparator 151 should always be fed directly by the output terminal 105.

Figure 4:
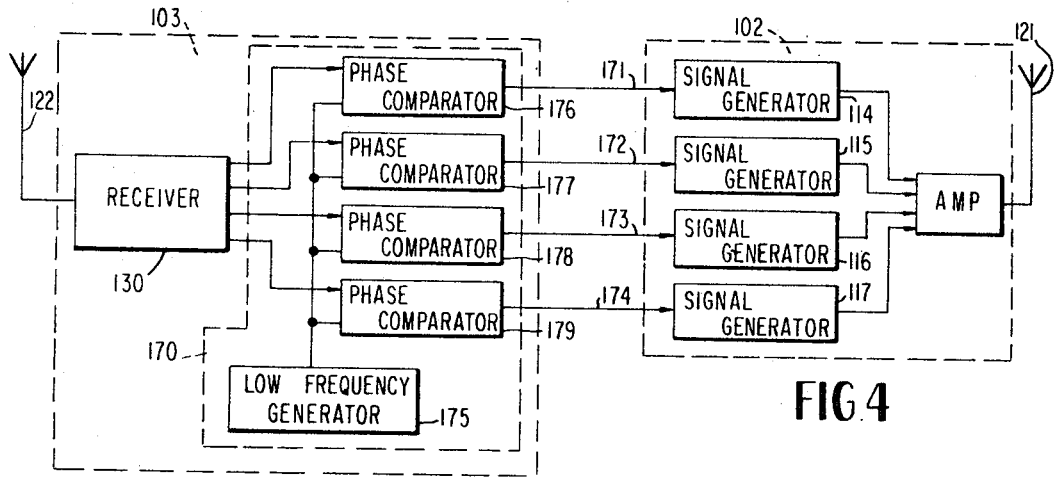

In this case, also, the frequency of the beat waves should be very stable and this leads to a modification in the control system 103 of FIG. 2. Said modification is illustrated in FIG. 4 which shows the controlled transmitter 102 which remains unaltered as also the auxiliary controlling received 130 fed by the aerial 122. The proposed modification consists in associating a low frequency generator 175 supplying a highly stabilized frequency equal to $f$ and in feeding the second inputs of the four phase comparators 176, 177, 178, 179 substituted for the phase comparators 134, 135, 136 with the voltage fed by said generator 175, the first inputs of said four comparators being fed by the four beat waves supplied by the receiver 130. The comparator 176 controls the frequency of the generator 114 through the connection 171 and similarly 115 is controlled through the connection 172 by the comparator 177 and again 116 is controlled through the connection 173 by the comparator 178 and 117 is connected through 174 with the comparator 179, said connections constraining thus the values of the frequencies of the four beat waves to be constantly equal to that provided by the generator 175 and ensuring also a locking of the phases.

Figure 5:
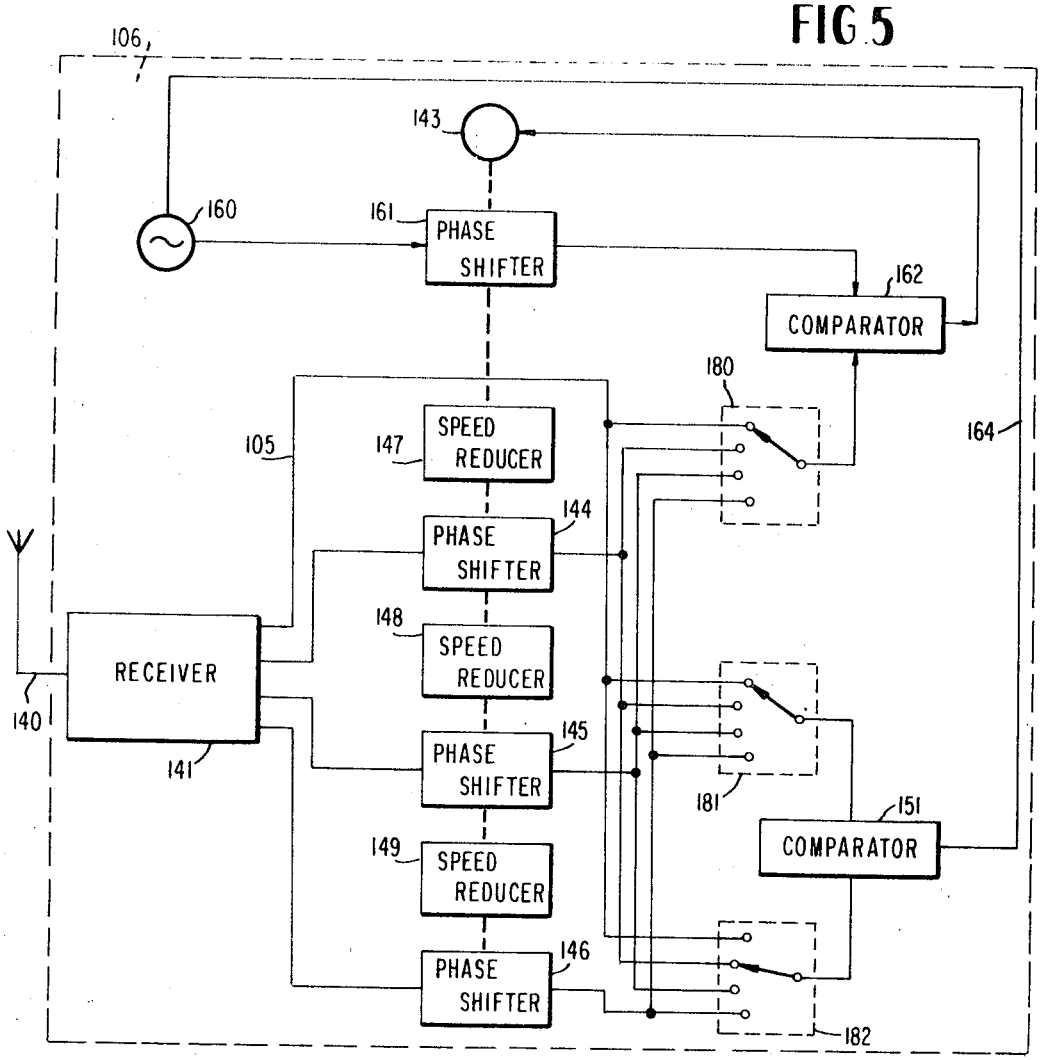

Lastly, FIG. 5 illustrates a possible modification selected among others of the movable receiver illustrated in FIG. 3. Said modification distinguishes from that of FIG. 3 only through the presence of three switches 180, 181, 182 replacing the single switch 150 of FIG. 3. Said switch 180 provides a connection of the second input of the comparator 162 selectively with the terminal 105 supplying the frequency $f_1$, with the phase shifter 144 supplying the frequency $f_2$, with the phase shifter 145 supplying the frequency $f_3$ or again with the phase shifter 146 supplying the frequency $f_4$.

Similarly, the switch 181 allows connecting the first input of the comparator 151 either with 105, with 144, with 145 or with 146. Lastly, the switch 182 allows connecting the second input of the comparator 151 selectively with one of said terminals 105, 144, 145 or 146.

The part played by the switch 180 is similar to that played by the switch 31 illustrated in FIG. 1 and in particular it allows substituting for the waves supplied by 145 in the case of a failure of the latter one of the waves passing out of 144, 145 or 146.

The switches 181 and 182 should always be connected each with a different output. They play a part comparable with that of the switch 150 of FIG. 3 inasmuch as they allow selecting for the control of the oscillator 160 any desired couple of waves selected out of the four beat waves after a possible phase shift by 144, 145 or 146 which may be of a particular interest in the case where one or even two of said beat waves are transiently locking.

Obviously as in the case of FIG. 1 it is possible to cut off the connection 164 through which the output of the comparator 151 acts on the oscillator 160 in the case where three out of the four beat waves are failing and consequently the output of 151 is not significant, the switch 180 being in a position such that the second input of 162 is fed by the last operative wave, possibly phase-shifted at 144, 145 or 146.

What we claim is:

1. A method for radio-locating the position of a double-channelled receiver associated with a first and a second transmitter, consisting in radiating from the first transmitter two unmodulated waves $F_1$ and $F_3$ and from the second transmitter two unmodulated waves $F_2$ and $F_4$ to produce beat waves of equal frequencies $$f = F_1 - F_2 = F_3 - F_4$$

in the corresponding channels of the receiver, producing at the receiver local waves tuned substantially to said beat frequency $f$, measuring selectively the phase difference between said local waves and the beat waves produced in either channel to form the desired radio-locating measurement, shifting the phase of the local waves into synchronism with that of the waves in the selected channel, dividing the phase difference measured by a predetermined figure $$N = \frac{F_1}{F_1 - F_3}$$

and causing said divided phase difference to shift the phase in one of the channels to produce the desired radio-locating measurement.

2. A method as claimed in claim 1, consisting in comparing the shifted phase in said one channel with that in the other channel and feeding the resultant channel to the source of local waves to lock it at the frequency $f$.

3. A radio-locating system comprising a first transmitter radiating unmodulated waves of frequencies $F_1$ and $F_3$, a second transmitter radiating unmodulated waves at frequencies $F_2$ and $F_4$ such that $F_1 - F_2 = F_3 - F_4 = f$, $f$ being substantially unvarying, a receiver including two channels adapted to receive the beat waves $F_1 - F_2$ and $F_3 - F_4$ respectively, an oscillator incorporated with the receiver and producing local waves at a frequency substantially equal to $f$, a first phase discriminator subjected selectively to the phase difference between said local frequency and that of the beats in one of the channels, a switch controlling the connection between said phase discriminator and either of said channels, a first phase shifter inserted between the oscillator and said first discriminator, an auxiliary motor controlled by said first phase discriminator and driving said first phase shifter, a further phase shifter connected with the output of one receiver channel, driven by the motor at a speed reduced with reference to that of the first-mentioned phase shifter in a ratio which is equal to a predetermined figure $$N = \frac{F_1}{F_1 - F_3}$$

and defining the desired phase to be measured and a second phase discriminator comparing the output of the further phase shifter with the beat frequency of the other receiver channel and connected with the oscillator to ensure constancy of the frequency $f$ of the local waves produced by said oscillator.

4. A radio-locating system as claimed in claim 3, comprising a switch adapted to cut off the output of the second discriminator when said switch provides connection with said one receiver channel.

5. A radio-locating system as claimed in claim 3, wherein the transmitters each produce waves on more than two frequencies, comprising at least one further receiver channel, still further phase-shifters driven by the motor at speeds reduced with reference to the first further phase-shifter and connected each with the output of the further receiver channel and defining the desired phase measurement with greater accuracies and means selectively connecting the second discriminator with said further phase-shifter and with any one of said still further phase-shifters.

6. In a radio-locating system as claimed in claim 3, the provision of a controlling receiving station for one of the transmitters, said receiving station comprising a receiver for the transmitted waves, an auxiliary oscillator producing waves at the beat frequency $f$ and phase comparators fed by said auxiliary oscillator and by the waves to be transmitted and controlling the phase of the latter.

7. A radio-locating system as claimed in claim 3, wherein the transmitters each produce waves on more than two frequencies and the receiver includes corresponding further receiving channels, said system comprising still further phase shifters driven by the motor at speeds reduced with reference to the first further phase shifter, connected each with the output of one further receiver channel and defining the desired phase to be measured with greater accuracies, whereby said switch controls the connection between the first phase discriminator and the different channels, and auxiliary switches connecting the first phase discriminator selectively with one of the different channels.

No references cited.

RODNEY D. BENNETT, JR., *Primary Examiner.*

M. F. HUBLER, *Assistant Examiner.*